Aug. 24, 1926.
J. W. CRAWFORD
1,597,058
HOOK RULE
Filed June 29, 1923
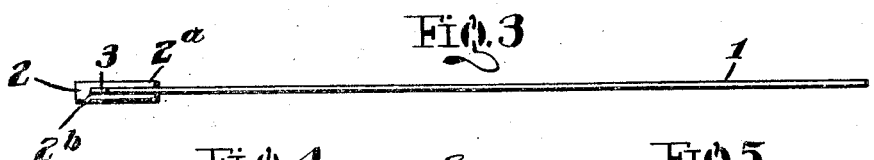
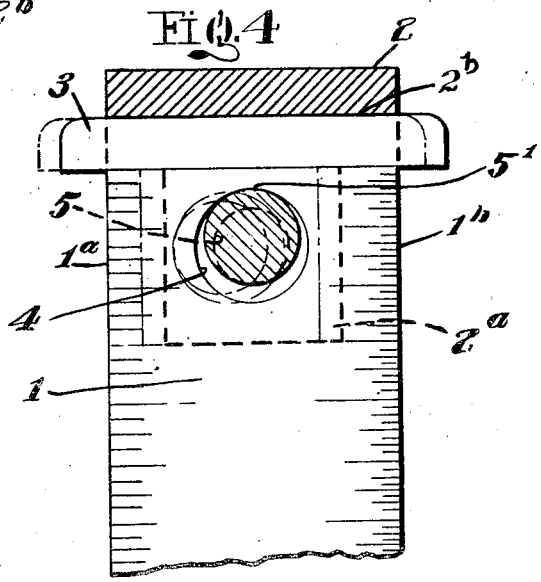
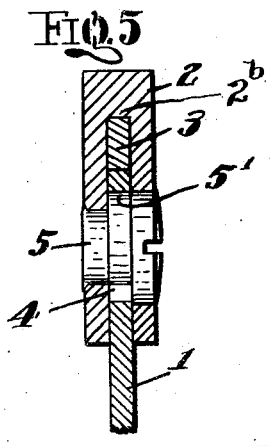
Inventor
John W. Crawford
By Ellis Spear Jr.
Attorney Patented Aug. 24, 1926.

1,597,058

UNITED STATES PATENT OFFICE.

JOHN W. CRAWFORD, OF ATHOL, MASSACHUSETTS, ASSIGNOR TO THE L. S. STARRETT COMPANY, OF ATHOL, MASSACHUSETTS, A CORPORATION OF MASSACHUSETTS.

HOOK RULE.

Application filed June 29, 1923. Serial No. 648,580.

This invention relates to measuring devices and particularly such devices as the so-called hook rule. As illustrative of my invention I have shown and will discuss such a rule pointing out therein the advantages and improvements in accordance with my invention.

Throughout the specification and drawings I have indicated corresponding parts by like letters of reference and in the drawings the parts are disclosed in the following figures:

Fig. 1 is an elevation showing one face of such a rule.

Fig. 2 showing a reverse face.

Fig. 3 an edge view of the same.

Fig. 4 an enlarged detail partly in section of the hook end of such a rule, and

Fig. 5 a similar transverse section.

Referring to Figs. 1 and 2 it will be seen that the rule shown consists of a thin straight edge member 1, and a head 2. The member 1 is preferably provided with graduations on both edges of both faces 1ª and 1ᵇ as shown in Figs. 1 and 2. These usually are divided into different graduations or systems of graduations as for example, eighths, sixteenths, thirty-seconds and sixty-fourths, the same being unit readings for different measurements, the device being reversible for that purpose. In a device of this sort the matter of reversibility has heretofore been somewhat difficult and usually only accomplished by making an adjustment or a reversing of the hook. Furthermore, the size of the hook has usually been fixed and not capable of any variation, the same being standard for all work under all conditions. The requirements under varying conditions are of course widely varied and sometimes a much longer hook is required than at others.

In accordance with my invention I provide the head end of my rule with a carefully ground square end 1ᶜ. On this I mount the head 2 which is slotted to receive the said squared end overlapping it as at 2ª. The overlapping portions 2ª are cut away on each side so as to expose the graduations up to the end of the member 1 so that readings close to the hook can be made on either side without difficulty. The recess in the head 2 is extended as at 2ᵇ and provides a bearing for the hook 3 which is of slightly greater length than the width of the head 2 so as to give normally uniform projection on each side sufficient for minimum hook engagement in making ordinary measurements.

The head receiving end of the member 1 is centrally provided with a large aperture 4 through which passes a stud 5 having an eccentric bearing 5¹ in the aperture 4. The stud head is preferably provided with a convenient screw driver slot so that it can be turned to give a cam tightening to the head 2 so that the hook member 3 can be clamped firmly on the squared end surface 1ᶜ. In this way the hook member 3 may be adjusted as desired as indicated in dotted lines in Fig. 4 or be clamped in any other desired position.

The immediate availibility of all four scales is of greatest convenience not only for direct readings of measurement but for the setting of inside calipers or dividers where the hooks 3 or the four angular corners or abutment shoulders 2ᶜ give convenient bearing for one leg.

My device is therefore not only at all times reversible so as to give any reading but is also adjustable to any position of hook and is at the same time in a form ready for convenient and economical manufacture.

Various modifications in the form and construction of my device may obviously be resorted to, all without departing from the spirit of my invention if within the limits of the appended claims.

What I therefore claim and desire to secure by Letters Patent is:—

1. A hook rule comprising a double-edged scale member having graduations on both edges of both sides, a slotted head adapted to receive one end of said scale member, a hook member disposed between the bottom of the slot and said end, and means for adjustably clamping said head on said end to adjustably hold said hook member.

2. A hook rule comprising a double-edged scale member having graduations on both edges of both sides, a slotted head adapted to receive one end of said scale member, a hook member disposed between the bottom of the slot and said end, and means for adjustably clamping said head on said end to adjustably hold the said hook member, the sides of said head adjacent the slotted section being reduced to expose said graduations.

3. A hook rule, comprising a graduated rule member having a squared end, a head applied to said rule member at the squared end thereof, a hook adjustable transversely of the rule member and between said head and the squared end of said rule member, and means for releasably holding the head in engagement with the hook to maintain the adjustment of the latter.

4. A hook rule comprising a graduated rule member, a head applied thereto at one end thereof and having a transverse slot, a hook adjustable in said slot between said head and the end of the rule member, and means for releasably holding the head in engagement with the hook to maintain the adjustment of the latter.

5. A hook rule comprising a flat double-edged rule member having a squared end and having graduations along both edges of both faces, a transversely slotted head of substantially the width of said rule member and over-lapping both faces of said rule member adjacent the squared end thereof, the overlapping portions on both faces of said head being reduced to expose the graduations of the rule member and said reduced portions providing a pair of abutment shoulders disposed parallel to the squared end of the rule member, a hook adjustable transversely between said squared end of the rule member and the head, and means for releasably holding the head in engagement with the hook to maintain the adjustment of the latter.

6. A hook rule comprising a flat double-edged rule member having a squared end and having graduations along both edges of both faces, a transversely slotted head of substantially the width of said rule member and over-lapping both faces of said rule member adjacent the squared end thereof, the over-lapping portions on both faces of said head being reduced to expose the graduations of the rule member and said reduced portions providing pairs of abutment shoulders disposed at right angles to each other, one pair of said shoulders being parallel with the squared end of the rule member and the other pair of shoulders being parallel with the edges of the rule member, a hook adjustable transversely between said squared end of the rule member and the head, and means for releasably holding the head in engagement with the hook to maintain the adjustment of the latter.

7. A hook rule comprising a flat double-edged rule member having a squared end and having graduations along both edges of both faces, a transversely slotted head of substantially the width of said rule member and over-lapping both faces of said rule member adjacent the squared end thereof, the over-lapping portions on both faces of said head being reduced to expose the graduations of the rule member and said reduced portions providing pairs of abutment shoulders disposed at right angles to each other, one pair of said shoulders being parallel with the squared end of the rule member and the other pair of shoulders being parallel with the edges of the rule member, a hook of greater length than the width of the rule member and adjustable transversely along the squared end of the rule member in the slot of said head, and means for releasably holding the head in engagement with the hook to maintain the adjustment of the latter.

8. A hook rule comprising a graduated rule member having a squared end, a transversely slotted head overlapping the faces of said rule member at the squared end thereof, the overlapping portions at the edges of said head being cut away to expose the graduations of the rule member adjacent the squared end of the rule member, a hook adjustable transversely between said squared end of the rule member and said head, and means for releasably holding the head in engagement with the hook to maintain the adjustment of the latter.

9. In combination with a rule, a hook engaged on one of its side edges with and adjustable along an end edge of the rule, a transversely slotted head engaged with the opposite side edge of the hook and with the opposed side faces of the rule, and a single fastening means for connecting the head to the rule and for clamping the hook in adjusted position.

10. In combination with a rule, a hook member having a side edge slidably engaged with an end edge of the rule, so as to be adjustable transversely of the rule, a transversely slotted head straddling said end of the rule and releasably holding the hook in engagement with the rule end, and means for securing the head to the rule and for clamping the hook in adjusted position.

11. In combination with a rule, a substantially U-shaped head applied thereto at one end thereof, a hook member disposed between the closed end of the head and the adjacent end edge of the rule for adjustment transversely thereof, a means for connecting the head to the rule and for clamping the hook member in adjusted position.

12. A hook rule, comprising a rule member, a transversely slotted head applied thereto adjacent one end and presenting a slideway disposed transversely of the rule, a hook adjustable in said slideway perpendicularly to the longitudinal axis of the rule, and means for holding the adjustment of said hook.

In testimony whereof I affix my signature.

JOHN W. CRAWFORD.